(12) United States Patent
Feng et al.

(10) Patent No.: US 10,438,389 B2
(45) Date of Patent: Oct. 8, 2019

(54) METHOD, DEVICE, AND NON-TRANSITORY COMPUTER READABLE STORAGE MEDIUM FOR DISPLAYING VIRTUAL REALITY OR AUGMENTED REALITY ENVIRONMENT ACCORDING TO A VIEWING ANGLE

(71) Applicant: HTC Corporation, Taoyuan (TW)

(72) Inventors: Hsu-Hong Feng, Taoyuan (TW); Wen-Hung Sun, Taoyuan (TW); Kai-Hsiu Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 70 days.

(21) Appl. No.: 15/705,253

(22) Filed: Sep. 14, 2017

(65) Prior Publication Data

US 2018/0130242 A1 May 10, 2018

Related U.S. Application Data

(60) Provisional application No. 62/418,291, filed on Nov. 7, 2016.

(51) Int. Cl.
*G06T 19/00* (2011.01)
*G06T 11/60* (2006.01)
*G06F 3/01* (2006.01)
*G06F 3/03* (2006.01)

(52) U.S. Cl.
CPC .............. *G06T 11/60* (2013.01); *G06F 3/011* (2013.01); *G06F 3/012* (2013.01); *G06F 3/013* (2013.01); *G06F 3/0304* (2013.01); *G06T 2200/24* (2013.01)

(58) Field of Classification Search
CPC ................................................... G06T 19/006
See application file for complete search history.

(56) References Cited

U.S. PATENT DOCUMENTS

| 2009/0153474 | A1* | 6/2009 | Quennesson | G06F 3/012 |
| | | | | 345/157 |
| 2012/0188148 | A1* | 7/2012 | DeJong | G02B 27/0093 |
| | | | | 345/8 |
| 2014/0125579 | A1 | 5/2014 | Yamamoto | |
| 2014/0361977 | A1* | 12/2014 | Stafford | G02B 27/0093 |
| | | | | 345/156 |
| 2015/0153922 | A1* | 6/2015 | Ballard | H04W 76/10 |
| | | | | 345/156 |

(Continued)

FOREIGN PATENT DOCUMENTS

WO 2016002318 A1 1/2016

OTHER PUBLICATIONS

Corresponding extended European search report dated Mar. 8, 2018.
(Continued)

*Primary Examiner* — Phong X Nguyen
(74) *Attorney, Agent, or Firm* — CKC & Partners Co., LLC

(57) ABSTRACT

A method for virtual reality (VR) or augmented reality (AR) includes sensing a relative angle between a reference direction defined by a first tracking device and a navigate direction defined by a second tracking device, calculating a viewing angle according to the relative angle between the reference direction and the navigate direction, and displaying a VR or AR environment in the corresponding viewing angle.

17 Claims, 7 Drawing Sheets

(56) References Cited

U.S. PATENT DOCUMENTS

| | | | |
|---|---|---|---|
| 2015/0199081 A1* | 7/2015 | Wheeler | G06F 3/0482 |
| | | | 715/781 |
| 2016/0011292 A1* | 1/2016 | Li | G01S 3/28 |
| | | | 342/359 |
| 2016/0018522 A1* | 1/2016 | Shen | G01S 17/50 |
| | | | 356/4.07 |
| 2016/0148434 A1* | 5/2016 | Blonde | G06F 3/012 |
| | | | 345/633 |
| 2016/0189426 A1* | 6/2016 | Thomas | G06T 19/006 |
| | | | 345/633 |
| 2017/0083084 A1* | 3/2017 | Tatsuta | G06F 3/147 |
| 2017/0090722 A1* | 3/2017 | Matsuzoe | G06F 3/04817 |
| 2017/0092002 A1* | 3/2017 | Mullins | G06F 3/013 |
| 2017/0171539 A1* | 6/2017 | Inomata | H04N 13/344 |
| 2018/0127024 A1* | 5/2018 | Pourrezaei Khaligh | |
| | | | B60D 1/246 |

OTHER PUBLICATIONS

Corresponding European official communication dated Jan. 21, 2019.

* cited by examiner

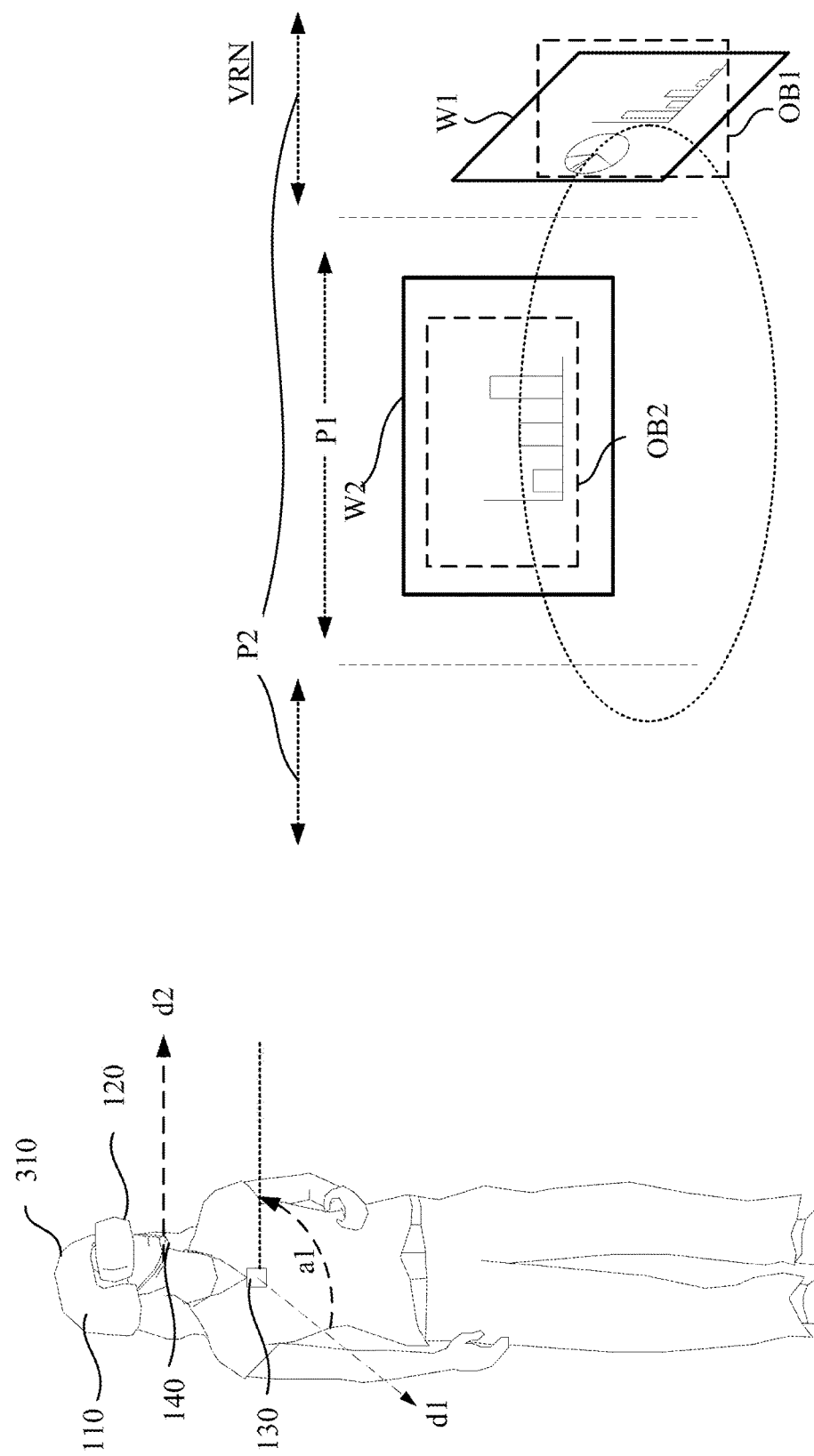

METHOD, DEVICE, AND NON-TRANSITORY COMPUTER READABLE STORAGE MEDIUM FOR DISPLAYING VIRTUAL REALITY OR AUGMENTED REALITY ENVIRONMENT ACCORDING TO A VIEWING ANGLE

RELATED APPLICATIONS

This application claims priority to U.S. Provisional Application Ser. No. 62/418,291 filed Nov. 7, 2016, which is herein incorporated by reference.

BACKGROUND

Technical Field

The present disclosure relates to an electronic device and a method. More particularly, the present disclosure relates to a virtual reality (VR) or augmented reality (AR) device and a method for VR or AR.

Description of Related Art

With advances in electronic technology, virtual reality (VR) systems are increasingly used.

A VR system may provide a user interface to a user to allow the user to interact with the VR system. Hence, how to design a user friendly interface is an important area of research in this field.

SUMMARY

One aspect of the present disclosure is related to a method for virtual reality (VR) or augmented reality (AR). In accordance with one embodiment of the present disclosure, the method includes sensing a relative angle between a reference direction defined by a first tracking device and a navigate direction defined by a second tracking device, calculating a viewing angle according to the relative angle between the reference direction and the navigate direction, and displaying a VR or AR environment in the corresponding viewing angle.

Another aspect of the present disclosure is related to a virtual reality (VR) or augmented reality (AR) device. In accordance with one embodiment of the present disclosure, the virtual reality (VR) or augmented reality (AR) device includes one or more processing components, memory electrically connected to the one or more processing components, and one or more programs. The one or more programs are stored in the memory and configured to be executed by the one or more processing components. The one or more programs includes instructions for controlling a first tracking device and a second tracking device for sensing a relative angle between a reference direction defined by the first tracking device and a navigate direction defined by the second tracking device, calculating a viewing angle according to the relative angle between the reference direction and the navigate direction, and controlling a display device for displaying a VR or AR environment in the corresponding viewing angle.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including controlling a first tracking device and a second tracking device for sensing a relative angle between a reference direction defined by the first tracking device and a navigate direction defined by the second tracking device, calculating a viewing angle according to the relative angle between the reference direction and the navigate direction, and controlling a display device for displaying a VR or AR environment in the corresponding viewing angle.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 4A is a diagram illustrating a user operating the VR/MR/AR system in accordance with some embodiments of the present disclosure.

FIG. 4B is a schematic diagram illustrating the VR or AR environment in response to the operation shown in FIG. 4A, in accordance with some embodiments of the present disclosure.

DETAILED DESCRIPTION

Figure 1:
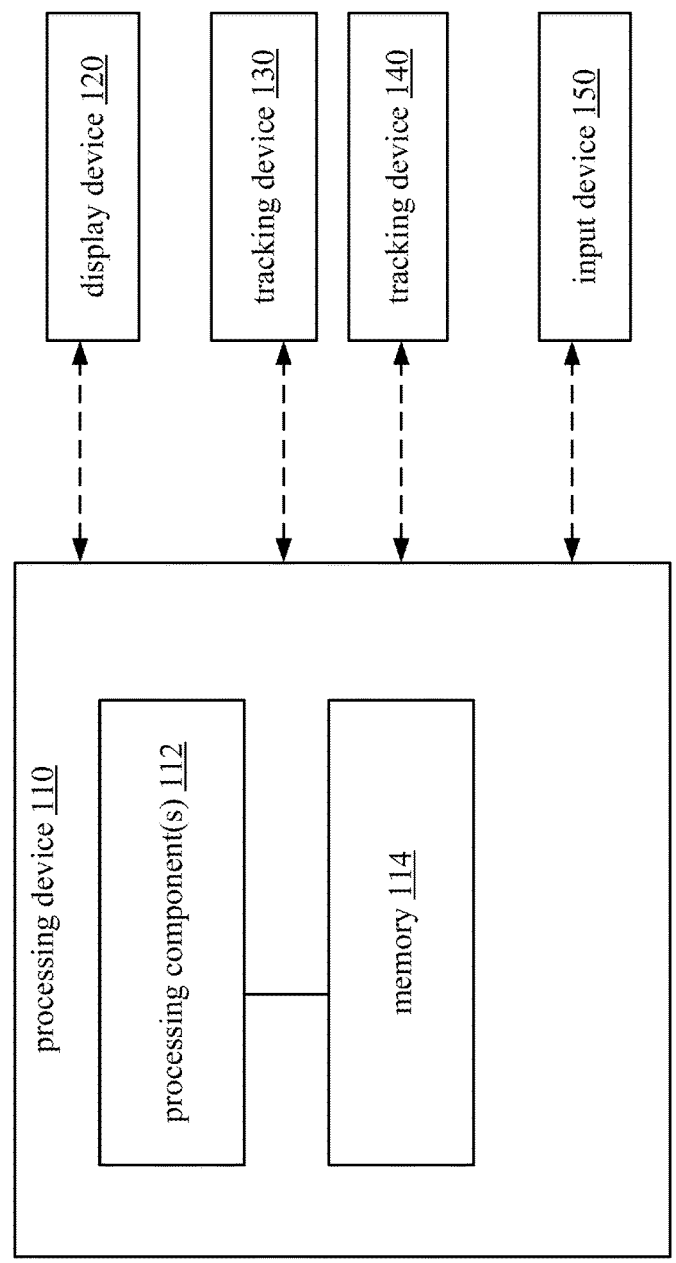
FIG. 1 is a schematic block diagram illustrating a virtual reality (VR)/mixed reality (MR)/augmented reality (AR) system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating a virtual reality (VR)/mixed reality (MR)/augmented reality (AR) system 100 in accordance with some embodiments of the present disclosure. In the embodiment shown in FIG. 1, the VR/MR/AR system 100 includes a processing device 110, a display device 120, tracking devices 130 and 140, and an input device 150. In some embodiments, the processing device 110 may be integrated with the display device 120, the tracking device 140 and/or the input device 150, and the present disclosure is not limited to the embodiment described herein. In some embodiments, the VR/MR/AR system 100 may include more than two tracking devices.

In some embodiments, the processing device 110 includes one or more processing components 112 and a memory 114. In the embodiment shown in FIG. 1, the one or more processing components 112 are electrically connected to the memory 114. In some embodiments, the processing device 110 may further include signal transceivers (not shown) for transmitting and receiving signals between the processing device 110 and the display device 120, signals between the processing device 110 and the tracking devices 130 and 140, and/or signals between the processing device 110 and the input device 150.

In some embodiments, the one or more processing components 112 can be realized by, for example, one or more processors, such as central processors and/or microprocessors, but are not limited in this regard. In some embodiments, the memory 114 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains. The display device 120 can be realized by, for example, a display, such as a liquid crystal display, or an active matrix organic light emitting display (AMO-LED), but is not limited in this regard.

In some embodiments, the one or more processing components 112 may run or execute various software programs and/or sets of instructions stored in memory 114 to perform various functions for the processing device 110 and to process data.

In some embodiments, the one or more processing components 112 may be configured to control the display device 130 to display corresponding VR or AR environment VRN according to head movement of a user wearing the tracking devices 130 and 140.

Figure 2:
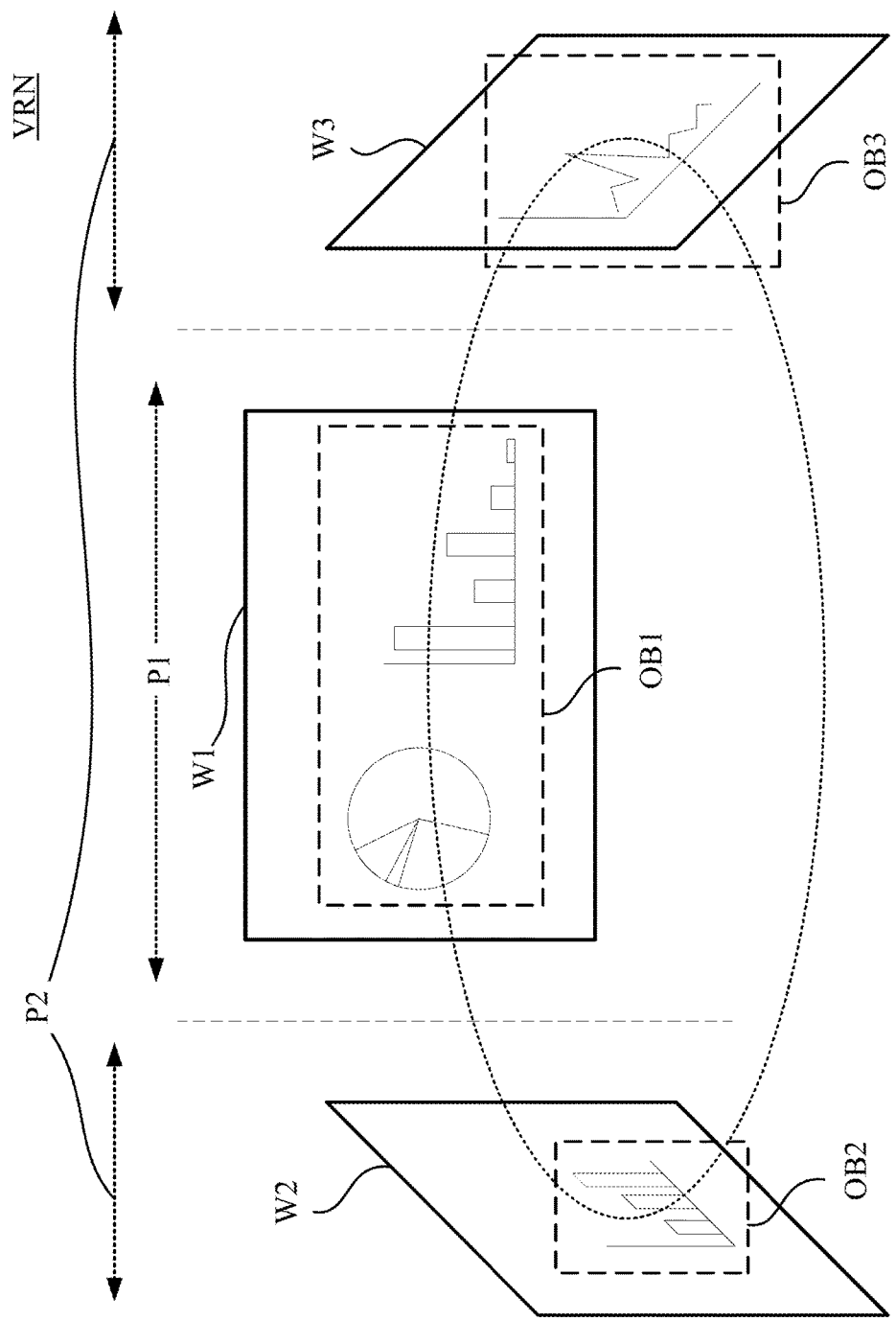
FIG. 2 is a schematic diagram illustrating a VR or AR environment in accordance with some embodiments of the present disclosure.

Reference is made to FIG. 2. FIG. 2 is a schematic diagram illustrating a VR or AR environment VRN in accordance with some embodiments of the present disclosure. In some embodiments, the one or more processing components 112 may control the display device 120 to display a plurality of widgets W1, W2, and W3 in a VR or AR environment VRN. For example, the widgets W1, W2, and W3 displayed in the VR or AR environment VRN may be the windows or working spaces. The widgets W1, W2, and W3 may respectively include a VR object OB1, a VR object OB2, and a VR object OB3 in the graphical user interface.

The widgets W1, W2, and W3 may be displayed in different portions of the VR or AR environment VRN. As shown in FIG. 2, the widget W1 is displayed in a center portion P1 of the VR or AR environment VRN. The widget W2 and the widget W3 are displayed in an edge portion P2 of the VR or AR environment VRN.

Alternatively stated, the processing components 112 may control the display device 120 to display the widgets W1, W2, and W3 in a panoramic view. It is noted that, although three widgets W1, W2, and W3 are displayed in the embodiment of FIG. 2, any other numbers of widgets are possible, and the present disclosure is not limited thereto.

Figure 3B:
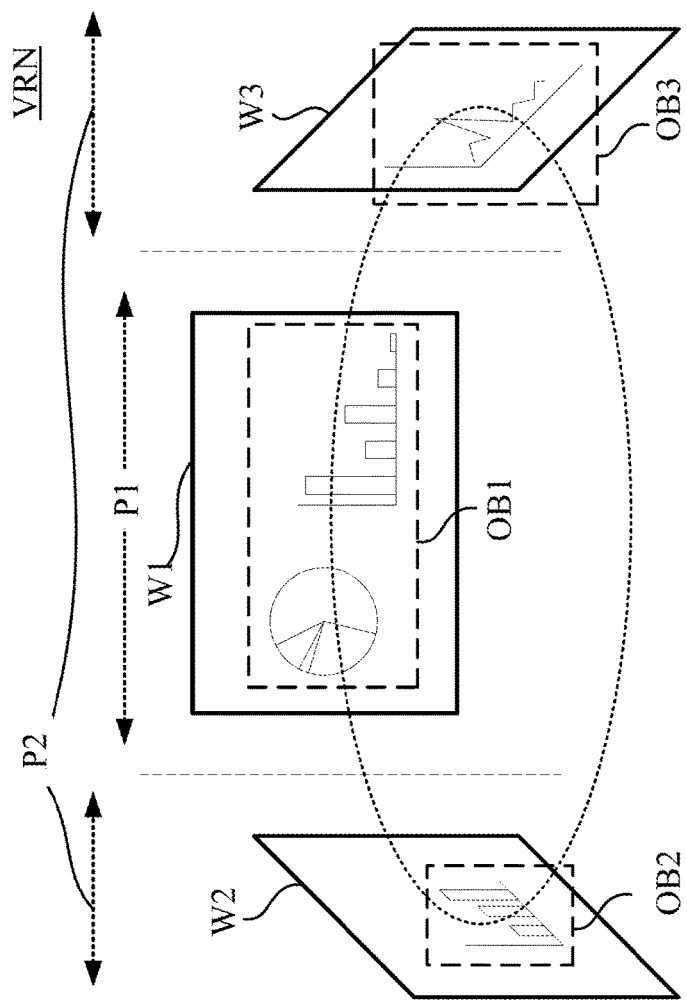
FIG. 3B is a schematic diagram illustrating the VR or AR environment in response to the operation shown in FIG. 3A, in accordance with some embodiments of the present disclosure.
Figure 3A:
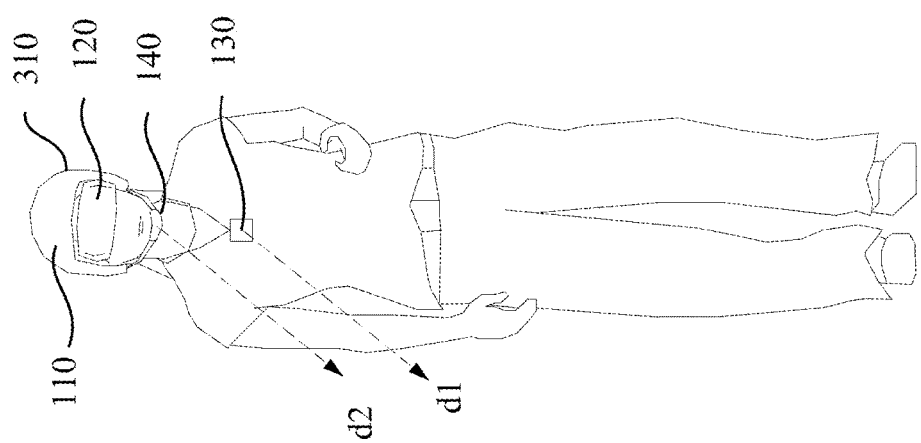
FIG. 3A is a diagram illustrating a user operating the VR/MR/AR system in accordance with some embodiments of the present disclosure.

Reference is made to FIG. 3A and FIG. 3B. FIG. 3A is a diagram illustrating a user operating the VR/MR/AR system 100 in accordance with some embodiments of the present disclosure. FIG. 3B is a schematic diagram illustrating the VR or AR environment VRN in response to the operation shown in FIG. 3A, in accordance with some embodiments of the present disclosure.

In some embodiments, the processing components 112 may control the tracking devices 130 and 140 for sensing a relative angle a1 between a reference direction d1 and a navigate direction d2. The reference direction d1 may be defined by the tracking device 130 and the navigate direction d2 may be defined by the tracking device 140.

As shown in FIG. 3A, in some embodiments, the processing device 110, the display device 120 and the tracking device 140 may be integrated in a VR helmet (or VR headset) 310 worn by a user. Alternatively stated, the tracking device 140 may be located on the user, such that the navigate direction d2 is defined as a direction the head of the user is facing. The tracking device 130 may also be located on the user, such that the reference direction d1 is the anterior/ventral direction of the body of the user. For example, the tracking device 130 may be arranged on a necklace worn by the user.

Accordingly, by the operation of the tracking devices 130 and 140, the relative angle, which indicates the head yaw angle of the user, may be detected, and then transmitted to the processing device 110 via the signal communication between the processing device 110 and the tracking devices 130 and 140. Thus, the processing components 112 may calculate a viewing angle according to the relative angle between the reference direction d1 and the navigate direction d2.

After the viewing angle is calculated and obtained, the processing components 112 may control the display device 120 for displaying the VR or AR environment VRN in the corresponding viewing angle. Thus, the display device 120 may display the VR or AR environment VRN in the viewing angle synchronized to the user's head movement.

For example, as shown in FIG. 3B, on the condition that the user is facing the front, i.e., the relative angle between the reference direction d1 and the navigate direction d2 is smaller than a predetermined value and within a first range, the processing components 112 may control the display device 120 for displaying the widget W1 in the center portion P1 of the VR or AR environment VRN, and displaying the widget W2 in the edge portion P2 of the VR or AR environment VRN.

Reference is also made to FIG. 4A and FIG. 4B. FIG. 4A is a diagram illustrating a user operating the VR/MR/AR system 100 in accordance with some embodiments of the present disclosure. FIG. 4B is a schematic diagram illustrating the VR or AR environment VRN in response to the operation shown in FIG. 4A, in accordance with some embodiments of the present disclosure.

As shown in FIG. 4A and FIG. 4B, on the condition that the user is turning head to the left, i.e., the relative angle a1 between the reference direction d1 and the navigate direction d2 is within a second range different from the first range, the processing components 112 may control the display device 120 for displaying the widget W2 in the center portion P1 of the VR or AR environment VRN, and displaying the widget W1 in the edge portion P2 of the VR or AR environment VRN. Similarly, on the condition that the user is turning head to the right, i.e., the relative angle a1 between the reference direction d1 and the navigate direction d2 is within a third range different from the first range and the second range, the processing components 112 may control the display device 120 for displaying the widget W3 in the center portion P1 of the VR or AR environment VRN, and displaying the widget W1 in the edge portion P2 of the VR or AR environment VRN.

It is noted that, in some other embodiments, the relative angle a1 may also indicate the head pitch angle or the head roll angle of the user by the operation of the tracking devices 130 and 140, and the processing components 112 may calculate the viewing angle and control the display device 120 for displaying the VR or AR environment VRN in the corresponding viewing angle accordingly.

Through the operations discussed above, a user friendly operation interface in a VR or AR environment may be implemented, in which the VR or AR environment is extended, and users may browse between multiple windows or working spaces in the VR or AR environment by simply turning head to the left or the right. Therefore, a walking user may wear the VR helmet and interact with the VR or AR environment VRN conveniently.

Figure 5:
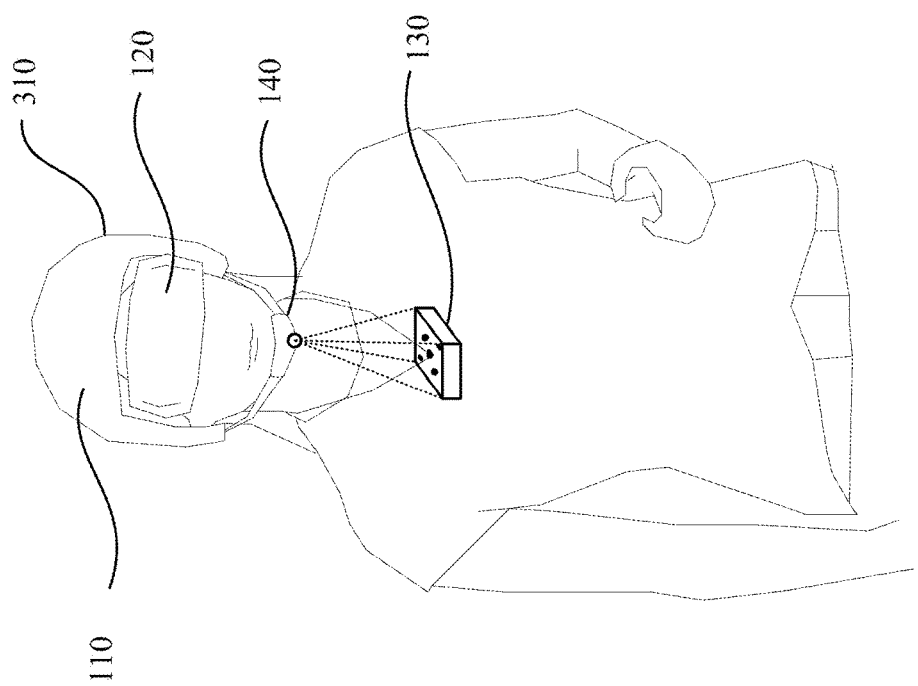
FIG. 5 is a diagram illustrating the VR/MR/AR system in accordance with some embodiments of the present disclosure.

In following paragraphs, the operation of sensing the relative angle a1 will be discussed in accompanying with the drawings. Reference is made to FIG. 5. FIG. 5 is a diagram illustrating the VR/MR/AR system 100 in accordance with some embodiments of the present disclosure. As shown in FIG. 5, in some embodiments, the tracking device 130 is arranged on the necklace worn by the user. The tracking device 130 includes an image feature for identification. The processing device 110, the display device 120 and the tracking device 140 are integrated in a VR helmet 310 worn by the user, in which the tracking device 140 is arranged on a jaw strap of the VR helmet 310.

The tracking device 140 may be configured to detect a marker on the image feature using, for example, a camera located on the tracking device 140. The marker can be any type of marker, identifier, sign, symbol, etc. In some embodiments, the marker can be, for example, a dot having predefined characteristics (e.g., shape, color, size, pattern, etc.). In some embodiments, the marker can be referred to as, for example, a fiducial marker.

Thus, the processing components 112 may control the camera located on the tracking device 140 for capturing the image feature on the tracking device 130. Then, the processing components 112 may calculate the relative angle a1 based on the image feature captured by the camera.

Figure 6:
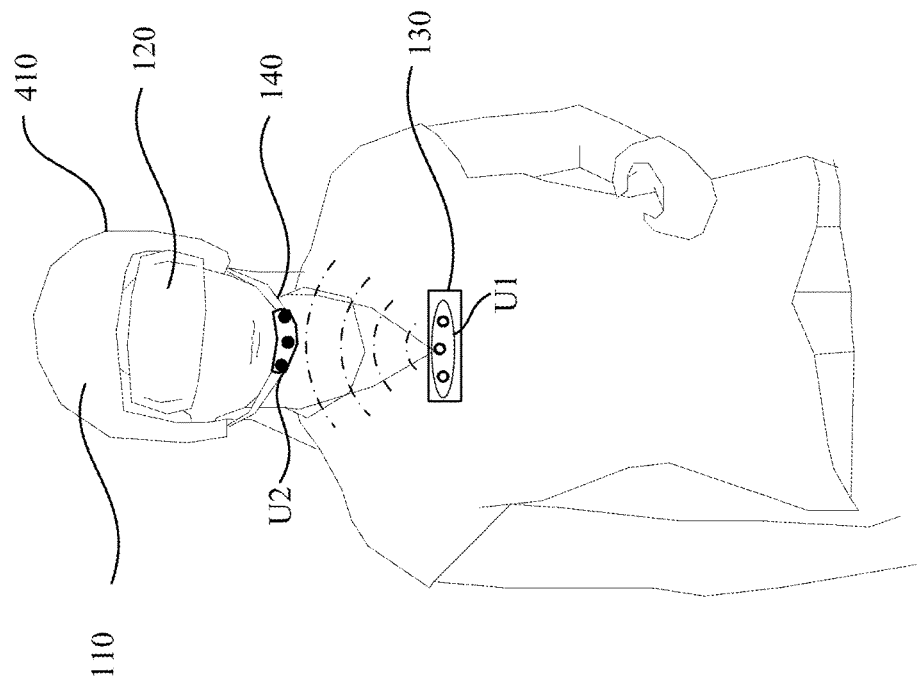
FIG. 6 is a diagram illustrating the VR/MR/AR system in accordance with some other embodiments of the present disclosure.

Reference is made to FIG. 6. FIG. 6 is a diagram illustrating the VR/MR/AR system 100 in accordance with some other embodiments of the present disclosure. As shown in FIG. 6, in some embodiments, the tracking device 130 is arranged on the necklace worn by the user. The processing device 110, the display device 120 and the tracking device 140 are integrated in a VR helmet 410 worn by the user, in which the tracking device 140 is arranged on a jaw strap of the VR helmet 410.

The tracking device 130 and the tracking device 140 may respectively include an ultrasonic locator U1 and an ultrasonic locator U2. For example, in some embodiments, the ultrasonic locator U1 may include one or more ultrasonic transmitters. The ultrasonic locator U2 may include one or more ultrasonic receivers. Accordingly, if the user's head movement occurs, the amplitude of the signal received by each of the ultrasonic receivers in the ultrasonic locator U2 changes correspondingly. Thus, the processing components 112 may calculate the relative angle based on the ultrasonic signals received by the ultrasonic locator U2.

In some other embodiments, the ultrasonic locator U1 may include one or more ultrasonic receivers or transceivers. The ultrasonic locator U2 may include one or more ultrasonic transmitters or transceivers. Alternatively stated, the ultrasonic locator U1 or U2 may sense changes of the ultrasonic signal received from another ultrasonic locator U2 or U1, such that the processing components 112 may calculate the relative angle based on the ultrasonic signals received by the ultrasonic locator U1 or U2.

Therefore, the processing components 112 may control the display device 120 for displaying the VR or AR environment VRN in the corresponding viewing angle, based on the relative angle a1 detected by the tracking device 130 and the tracking device 140, which may be implemented in various ways, including but not limited to the embodiments shown in FIG. 5 and FIG. 6.

Figure 7:
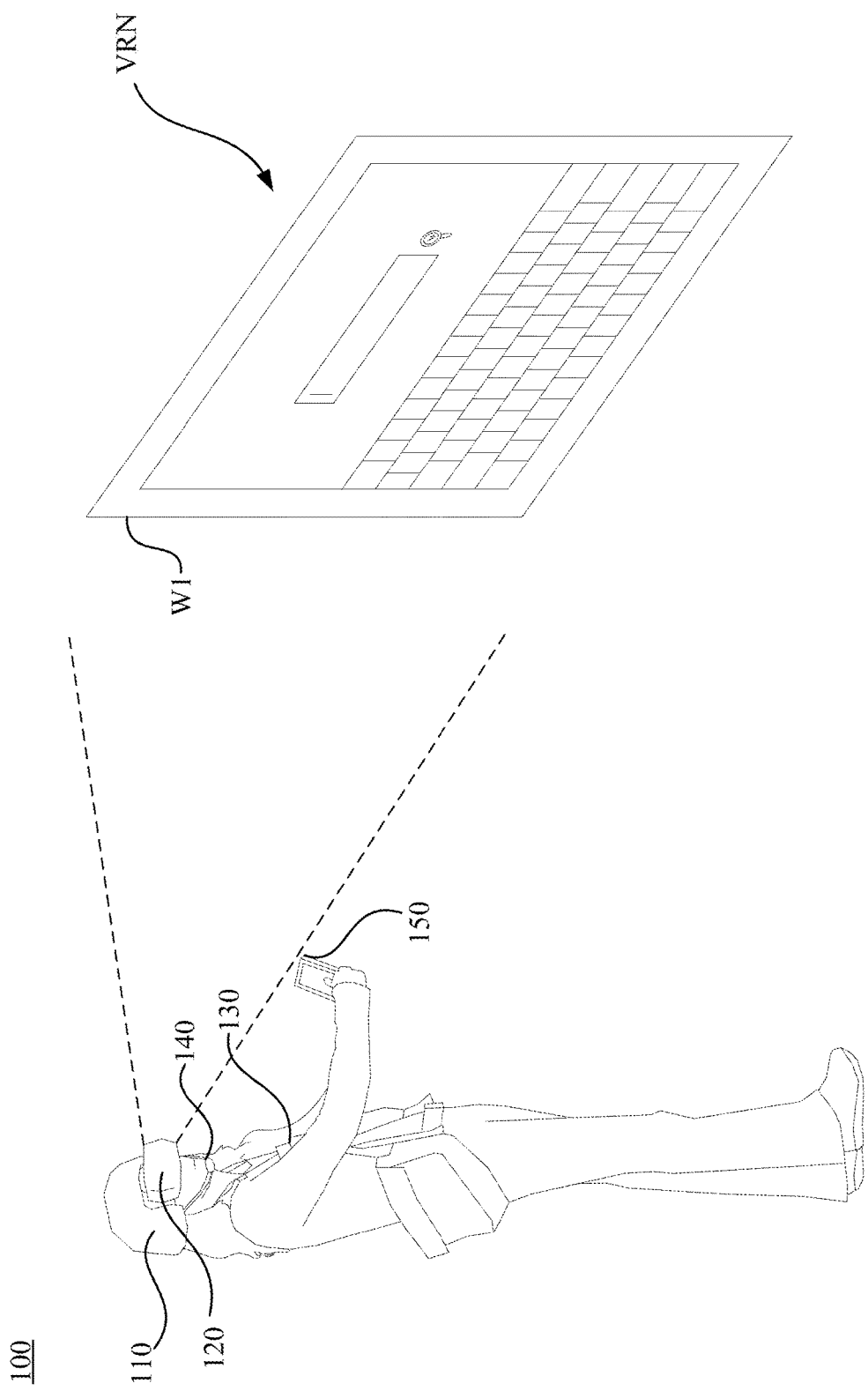
FIG. 7 is a diagram illustrating the VR/MR/AR system in accordance with some embodiments of the present disclosure.

Reference is made to FIG. 7. FIG. 7 is a diagram illustrating the VR/MR/AR system 100 in accordance with some embodiments of the present disclosure. As shown in FIG. 7, the user may input text or commands using the input device 150.

In some embodiments, the input device 150 may be integrated in a VR controller, in which the VR controller can be realized by, for example, a handheld controller, such as a controller for Vive or a controller for Gear, a touch-input controller such as a smartphone, a smart bracelet, or a smart glove including touch sensors. The term "glove," as we use it herein, may refer to any type of covering for a hand, whether it covers the hand fully or partially.

In some embodiments, the input device 150 may include a multi-point touch sensor configured to detect the numbers of fingers tapping to the sensor at the same time. Each letter or input element may be coded and a unique code is assigned thereto, in which each of the codes includes one or more digits of numbers of fingers tapping to the input device 150 at the same time.

For example, letters may be coded using Huffman coding, but the present disclosure is not limited thereto. For example, the difficulties of the typing and the input digits required for each letter may be taken into account when assigning codes to the letters, in order to provide a friendly user experience.

The following Table 1 is a possible coding for letters of the modern English alphabet.

TABLE 1

| Letter | Code | Letter | Code |
|---|---|---|---|
| E | 11 | M | 441 |
| T | 22 | U | 411 |
| A | 33 | G | 442 |
| O | 12 | P | 422 |
| N | 21 | Y | 443 |
| R | 31 | W | 433 |
| I | 13 | B | 412 |
| S | 14 | V | 421 |
| H | 32 | K | 431 |
| D | 23 | X | 413 |
| L | 24 | J | 432 |
| C | 34 | Q | 414 |
| F | 444 | Z | 423 |

As shown in Table 1, if a user wants to type letter "A," the user may tap the input device 150 with three fingers twice, in order to insert the code 3-3 corresponding to letter A. If a user wants to type letter "B," the user may tap the input device 150 with four fingers, with one finger, and then with two fingers, in order to insert the code 4-1-2 corresponding to letter B, and so on. It is noted that Table 1 is merely a possible coding table example and not meant to limit the present disclosure. In some embodiments, the codes of the letters may be shown on the keyboard object displayed in the VR or AR environment VRN, in order to provide indications for user. Furthermore, in some embodiments, if one or more digits have been inputted, remaining letter candidates may be highlighted in different colors or brightness on the virtual keyboard to prompt the user.

In addition, in some embodiments, the user may interact with the input device 150 using various gestures for further control. For example, single finger fling may be the arrow key for corresponding direction (right, left, up, down) to choose the word, and a check gesture may be the enter key to confirm. Similarly, double finger fling to the left may be the backspace key for delete, double finger fling to the right may be the gesture to repeat the previously inserted letter, and double finger fling up and down may be the gesture to switch between different languages or symbols. It is noted that the gestures stated above are merely examples and not meant to limit the present disclosure.

In some other embodiments, through image processing, a camera in the input device 150 may also be used to scan the numbers of the fingers reaching out to implement the number-based input method mentioned above. Accordingly, the input device 150 may implement the position-free input interface in various approaches, in which users can perform typing without targeting specific locations or regions in the VR or AR environment VRN or in the reality. In addition, since the information and feedbacks are provided and displayed in the VR or AR environment VRN, the typing process may be achieved without requiring users to look away from their usual viewpoints, and users may perform typing in a head-up position while walking. Therefore, a walking user may wear the VR helmet and interact with the VR or AR environment VRN conveniently.

Figure 8:
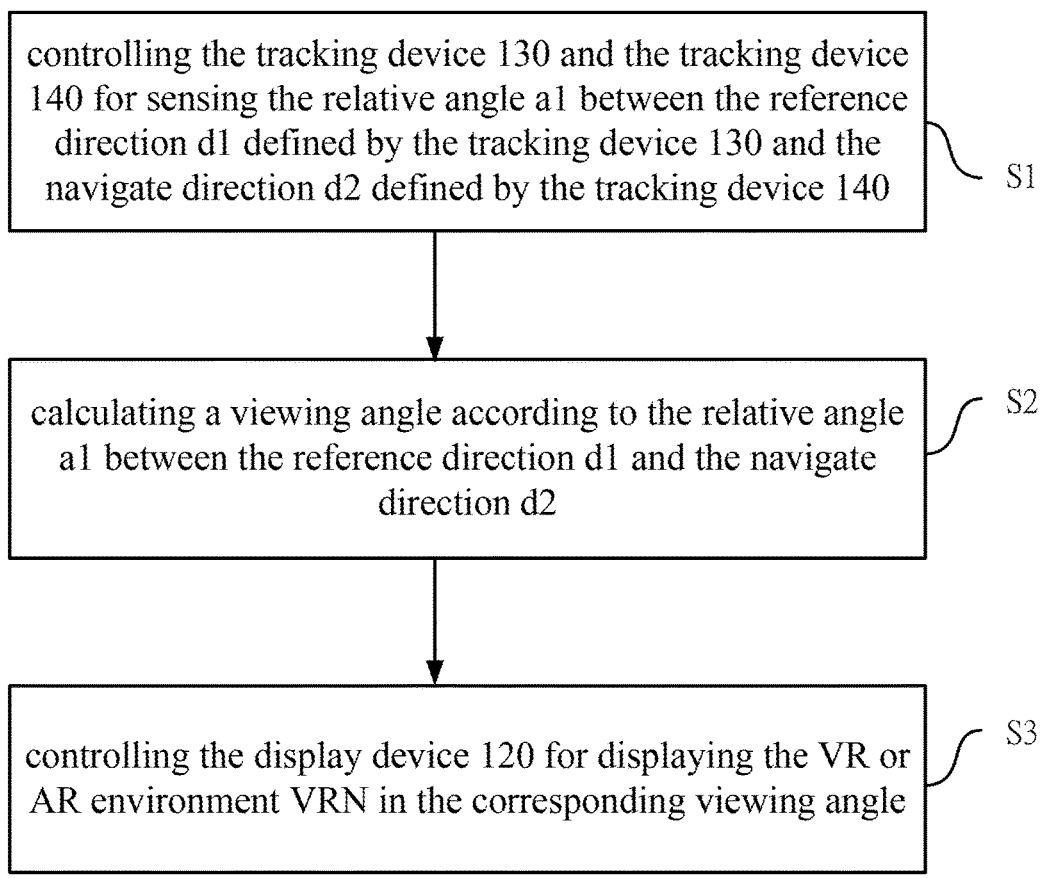
FIG. 8 is a flowchart illustrating a method for VR in accordance with some embodiments of the present disclosure.

Reference is made to FIG. 8. FIG. 8 is a flowchart illustrating a method 200 for VR in accordance with some embodiments of the present disclosure. It should be noted that the method 200 can be applied to a processing device 110 having a structure that is the same as or similar to the structure of the processing device 110 shown in FIG. 1. To simplify the description below, the embodiment shown in FIG. 1 will be used as an example to describe the method 200 according to some embodiments of the present disclosure. However, the present disclosure is not limited to application to the embodiment shown in FIG. 1. As shown in FIG. 8, the method 200 includes the operations S1, S2 and S3.

In operation S1, the one or more processing components 112 controls the tracking device 130 and the tracking device 140 for sensing the relative angle a1 between the reference direction d1 defined by the tracking device 130 and the navigate direction d2 defined by the tracking device 140.

In operation S2, the one or more processing components 112 calculates a viewing angle according to the relative angle a1 between the reference direction d1 and the navigate direction d2.

In operation S3, the one or more processing components 112 controls the display device 120 for displaying the VR or AR environment VRN in the corresponding viewing angle.

Details of the method 200 can be ascertained with reference to the paragraphs above, and a description in this regard will not be repeated herein.

It should be noted that, in some embodiments, the method 200 may be implemented as a computer program. When the computer program is executed by a computer, an electronic device, or the one or more processing components 112 in FIG. 1, this executing device performs the method 200. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the following method 200, no particular sequence is required unless otherwise specified. Moreover, the following operations may also be performed simultaneously or the execution times thereof may at least partially overlap.

Furthermore, the operations of the following method 200 may be added to, replaced, and/or eliminated as appropriate, in accordance with various embodiments of the present disclosure.

Through the operations of various embodiments described above, a user friendly I/O operation interface in a VR or AR environment may be implemented.

Although the present disclosure has been described in considerable detail with reference to certain embodiments thereof, other embodiments are possible. Therefore, the scope of the appended claims should not be limited to the description of the embodiments contained herein.

What is claimed is:

1. A method for virtual reality (VR) or augmented reality (AR) comprising:
   sensing a relative angle between a reference direction defined by a first tracking device and a navigate direction defined by a second tracking device;
   calculating a viewing angle according to the relative angle between the reference direction and the navigate direction; and
   displaying a VR or AR environment in the calculated viewing angle;
   wherein sensing the relative angle comprises:
      transmitting ultrasonic signals from a first ultrasonic locator located on the first tracking device to a second ultrasonic locator located on the second tracking device; and
      calculating the relative angle based on amplitude change of the ultrasonic signals received by the second ultrasonic locator.

2. The method as claimed in claim 1, wherein the first tracking device is located on a user, and the reference direction is an anterior direction of the body of the user.

3. The method as claimed in claim 2, wherein the second tracking device is located on the user, and the navigate direction is a direction the head of the user is facing.

4. The method as claimed in claim 1, wherein sensing the relative angle comprises:
   capturing an image feature on the first tracking device by a camera located on the second tracking device; and
   calculating the relative angle based on the image feature captured by the camera.

5. The method as claimed in claim 1, wherein displaying the VR or AR environment in the calculated viewing angle comprises:
   displaying a first widget in a center portion of the VR or AR environment if the relative angle in within a first range; and
   displaying the first widget in an edge portion of the VR or AR environment if the relative angle in within a second range.

6. The method as claimed in claim 5, wherein displaying the VR or AR environment in the calculated viewing angle comprises:
   displaying a second widget in the edge portion of the VR or AR environment if the relative angle in within the first range; and
   displaying the second widget in the center portion of the VR or AR environment if the relative angle in within the second range.

7. A virtual reality (VR) or augmented reality (AR) device comprising:
   a first tracking device and a second tracking device located on a user;
   one or more processing components; and
   a memory electrically connected to the one or more processing components;
   wherein one or more programs are stored in the memory and configured to be executed by the one or more processing components, wherein the one or more programs comprises instructions for:
      controlling the second tracking device for sensing a relative angle between a reference direction defined by the first tracking device and a navigate direction defined by the second tracking device;
      calculating a viewing angle according to the relative angle between the reference direction and the navigate direction;
      controlling a display device for displaying a VR or AR environment in the calculated viewing angle;
      controlling a first ultrasonic locator located on the first tracking device for receiving or transmitting ultrasonic signals with a second ultrasonic locator located on the second tracking device; and
      calculating the relative angle based on amplitude change of the ultrasonic signals received by the first ultrasonic locator or the second ultrasonic locator.

8. The VR or AR device as claimed in claim 7, wherein the first tracking device is located on a user, and the reference direction is an anterior direction of the user.

9. The VR or AR device as claimed in claim 8, wherein the second tracking device is located on the user, and the navigate direction is a direction the head of the user is facing.

10. The VR or AR device as claimed in claim 7, further comprising instructions for:
    controlling a camera located on the second tracking device for capturing an image feature on the first tracking device; and
    calculating the relative angle based on the image feature captured by the camera.

11. The VR or AR device as claimed in claim 7, further comprising instructions for:
    controlling the display device for displaying a first widget in a center portion of the VR or AR environment if the relative angle in within a first range; and
    controlling the display device for displaying the first widget in an edge portion of the VR or AR environment if the relative angle in within a second range.

12. The VR or AR device as claimed in claim 11, further comprising instructions for:
    controlling the display device for displaying a second widget in the edge portion of the VR or AR environment if the relative angle in within the first range; and
    controlling the display device for displaying the second widget in the center portion of the VR or AR environment if the relative angle in within the second range.

13. A non-transitory computer readable storage medium storing one or more programs comprising instructions, which when executed, causes one or more processing components to perform operations comprising:
    controlling a first tracking device and a second tracking device for sensing a relative angle between a reference direction defined by the first tracking device and a navigate direction defined by the second tracking device;
    calculating a viewing angle according to the relative angle between the reference direction and the navigate direction;
    controlling a display device for displaying a VR or AR environment in the calculated viewing angle;

controlling a first ultrasonic locator located on the first tracking device for transmitting ultrasonic signals to a second ultrasonic locator located on the second tracking device; and calculating the relative angle based on amplitude change of the ultrasonic signals received by the second ultrasonic locator.

14. The non-transitory computer readable storage medium as claimed in claim 13, wherein the reference direction is an anterior direction of the body of a user, and the navigate direction is a direction the head of the user is facing.

15. The non-transitory computer readable storage medium as claimed in claim 13 comprising instructions, which when executed, causes one or more processing components to further perform operations comprising:

controlling a camera located on the second tracking device for capturing an image feature on the first tracking device; and calculating the relative angle based on the image feature captured by the camera.

16. The non-transitory computer readable storage medium as claimed in claim 13 comprising instructions, which when executed, causes one or more processing components to further perform operations comprising:

controlling the display device for displaying a first widget in a center portion of the VR or AR environment if the relative angle in within a first range; and controlling the display device for displaying the first widget in an edge portion of the VR or AR environment if the relative angle in within a second range.

17. The non-transitory computer readable storage medium as claimed in claim 16 comprising instructions, which when executed, causes one or more processing components to further perform operations comprising:

controlling the display device for displaying a second widget in the edge portion of the VR or AR environment if the relative angle in within the first range; and controlling the display device for displaying the second widget in the center portion of the VR or AR environment if the relative angle in within the second range.

* * * * *